(12) United States Patent
Yang

(10) Patent No.: US 9,505,186 B2
(45) Date of Patent: Nov. 29, 2016

(54) SEMI-RIGID PLASTIC ARTICLE, CARTON, OR PACKAGE WITH SELECT OPTICAL ELEMENT AND MANUFACTURING METHOD THEREOF

(71) Applicant: NEW HIP LIK PACKAGING PRODUCTS (SHENZHEN) CO., LTD., Guangdong (CN)

(72) Inventor: Jingmin Yang, Guangdong (CN)

(73) Assignee: New Hip Lik Packaging Products (Shenzhen) Co., Ltd., Guangdong (CN)

( * ) Notice: Subject to any disclaimer, the term of this patent is extended or adjusted under 35 U.S.C. 154(b) by 65 days.

(21) Appl. No.: 14/013,197

(22) Filed: Aug. 29, 2013

(65) Prior Publication Data

US 2015/0004339 A1    Jan. 1, 2015

(30) Foreign Application Priority Data

Jul. 1, 2013 (CN) .......................... 2013 1 0271608
Aug. 9, 2013 (CN) .......................... 2013 1 0347343

(51) Int. Cl.
B29D 11/00 (2006.01)

(52) U.S. Cl.
CPC ...... B29D 11/0048 (2013.01); *Y10T 428/1352* (2015.01); *Y10T 428/24612* (2015.01)

(58) Field of Classification Search
CPC .................. B29D 11/0048; Y10T 428/24612; Y10T 428/1352
See application file for complete search history.

(56) References Cited

U.S. PATENT DOCUMENTS

| 2009/0220708 A1* | 9/2009 | Schmitt ..................... B41M 3/00 428/29 |
| 2010/0037326 A1* | 2/2010 | Batistatos et al. ............... 726/34 |
| 2012/0160747 A1* | 6/2012 | Striebich et al. ............... 210/85 |

FOREIGN PATENT DOCUMENTS

| CN | 1276332 A | 12/2000 |
| CN | 102092165 A | 6/2011 |
| CN | 102582334 A | 7/2012 |
| CN | 102926285 A | 2/2013 |
| CN | 103171816 A | 6/2013 |

\* cited by examiner

*Primary Examiner* — Mathieu Vargot
(74) *Attorney, Agent, or Firm* — Rosenberg, Klein & Lee

(57) ABSTRACT

A method of manufacturing a decorated semi-rigid plastic article, carton, package, or box, including: defining a select region of a semi-rigid plastic film or sheet according to a design requirement; applying a clear, colored, or highly reflective coating onto the select region, positioning said coating relative to an embossing form, said embossing form containing at least one Optical Element, bringing the embossing form and coating into intimate contact, hardening, drying, or curing the coating such that it permanently adopts the mirror image of at least one Optical Element, and separating the coating from the embossing form such that the semi-rigid plastic film or sheet contains a selectively applied Optical Element. The above method of manufacturing the semi-rigid plastic article has simple steps, simple operation and low cost. A semi-rigid plastic packing box manufactured by the above method containing both see through transparent regions and select Optical Elements is also provided.

7 Claims, 3 Drawing Sheets

SEMI-RIGID PLASTIC ARTICLE, CARTON, OR PACKAGE WITH SELECT OPTICAL ELEMENT AND MANUFACTURING METHOD THEREOF

FIELD OF THE INVENTION

The present disclosure relates to a manufacturing method of a decorated article containing select Optical Elements, and more particularly to a printed semi-rigid plastic carton or package with select transparent areas, select Optical Elements, and a manufacturing method thereof.

BACKGROUND OF THE INVENTION

The incorporation of Optical Elements to enhance the visual appeal of print and packaging has been used for many decades. "Optical Elements" herein defined as Holograms, Diffraction patterns, Fresnel lenses, Flies-Eye Lens Arrays and Lenticular Lens Arrays. Crown Roll Leaf in U.S. Pat. No. 6,461,544 describes a process of embossing Holographic images and Diffraction patterns into thin plastic films, subsequently metalized or coated with high refractive index coatings, and traditionally laminated to substrates for the print and packaging industry. Kimberly-Clark Worldwide in U.S. Pat. Nos. 6,800,357 and 7,433,105 describes Optical Element incorporation onto printed articles by mounting select Optical Elements onto an embossing plate, opaque printing over select areas of overall wallpaper type of coverage of Optical Elements to achieve selectively visible Optical Elements, and Laminating Fresnel lens containing films onto carton stock and printing graphics onto at least a portion of the Fresnel lens to give the appearance of depth and dimension to the graphic, respectively. Joe Coburn, Jr. in U.S. Pat. No. 4,386,123 describes the incorporation of Opt5ical Elements, in one embodiment Fresnel lenses, for the print and packaging industry in the early 1980's. In the 1970's Rowland Technologies described lens arrays of Optical Elements for 3D effects for the print and packaging industry in U.S. Pat. No. 3,357,772. Further, Mireco Company in U.S. Pat. No. 7,130,126 describes an Optical Element of flies eye lens array on the surface of a plastic sheet, with printing of a graphic on the surface of the lens array and printing of patterns on the opposite surface of the plastic sheet wherein the surface printed image appears on the surface of the plastic sheet and the non-printed lenses magnify the printed pattern on the opposite surface to reveal a three-dimensional effect of the pattern floating above or below the surface printed graphic. Additionally, lenticular lens arrays have been used in point of sale advertising and decorative packaging such as DVD/VHS packaging since the 1980's.

Transparent plastic packaging materials are often used to enhance the perceived value of consumer products over that of traditional board or paper stock packaging. In U.S. Pat. Nos. 4,858,756, 5,069,334, and 5,678,492, Hip Lik, a predecessor to the assignee of this invention, Hip Lik, claimed certain aspects of a transparent box used for packaging consumer goods. The ability to incorporate Optical Elements in transparent semi-rigid decorated articles and packaging has been limited to overall Optical Element areas which prevents retaining areas of true see through clarity, or requiring expensive select Optical Element embossing or engraving tools designed to selectively impart the Optical Effect onto the transparent material, as Kimberly-Clark's U.S. Pat. Nos. 6,800,357 and 7,433,105 patents claim.

The prior art thus requires expensive materials and processes and none to date offer the capability of the selective application of Optical Elements onto selectively applied receptive coatings for printed articles. Additionally, the prior art fails to teach a method of obtaining a "see through" transparent container with selective Optical Elements. There is thus a need for packaging that can incorporate the selective incorporation of Optical Elements in a simple and economic manner, and more particularly to incorporate such select Optical Elements while retaining areas of see through transparency in a printed or decorated article It is therefore a further object of this invention to create printed articles with select Optical Elements in an economical manner and to additionally create see through transparent areas in these articles for the print and packaging industry that takes advantage of the premium associated with transparent packaging, provide the potential for see through areas on the printed article, and to provide select Optical Elements to further enhance the perceived value of the printed article or package.

In summary, prior art only enabled Optical Elements incorporated onto the surface of metalized paper or plastic materials where the substrate making the package is either not transparent, or where to be a selective Optical Element, an expensive select Optical Element embossing tool is produced to impart the select Optical Element onto the article or the undesired Optical Elements of an overall Optical Element wall paper pattern are selectively covered up with opaque inks.

SUMMARY OF THE INVENTION

This invention involves the selective application of an Optical Element receptive coating, hardening the coating in contact with an embossing form containing at least one Optical Element such that the mirror image of the Optical Element is permanently imparted into the receptive coating and importantly not imparting any unwanted Optical Elements to any region not containing the receptive coating. This invention describes significant improvements over Ruschmann as described in U.S. Pat. No. 4,547,141 and is distinguished from prior art commonly referred to in the printing industry as "cast and cure", described in Breit Technologies website (http://www.breit-tech.com/) and incorporated herein, and further distinguished over the state of the art as claimed in Colgate Palmolive's PCT patent application WO2008076785, incorporated herein by reference; where the "cast and cure" technology involves an overall clear coating is applied ("cast") to a substrate (in Colgate Palmolive's invention, the traditionally metalized substrate is instead traditional carton or board stock printed with metallic particles) and an embossing plate containing over-all coverage of Optical Elements is placed into contact with the overall clear coating, the overall clear coating is hardened by ultraviolet light ("cure") and then the embossing plate removed to result in an overall pattern of Optical Elements permanently formed on the clear coating.

It is an object of the present disclosure to provide a decorated article, carton, or package and a method of manufacturing a substantially transparent semi-rigid plastic sheet printed and/or decorated and containing selective optical elements and selective transparent regions for use in the printing and packaging industry with simple operation and low cost to form a visual three dimensional pattern on the printed product or package.

In this invention, one method of manufacturing selective optical effects onto a transparent plastic sheet is achieved by applying a precisely positioned selective area of a substantially clear or highly reflective coating onto the transparent substrate, bringing a precision manufactured Optical Element into precise position relative to the select clear or highly reflective coating, bringing the Optical Element into intimate contact with the select clear or highly reflective coating, hardening, dry, or cure the substantially clear or highly reflective coating such that the substantially clear or highly reflective coating adopts the precise mirror image of the Optical Element in a precise location, and more importantly not in other regions where Optical Elements are not wanted, such as a transparent see through area of the article or package, then separating the Optical Element from the substantially clear or highly reflective coating, and using this transparent film or sheet containing selective Optical Elements in combination with other traditional printing or decorating technologies to result in a semi-rigid plastics film or sheet containing selective Optical Elements and selective transparent areas suitable for use in the printing and packaging world.

It is a further embodiment of the invention to enhance the Optical Element's visual impact by adding a reflective coating, ink, hot stamp foil to either the front or back surface of the select coating containing the mirror image of the Optical Element.

When the select Optical Element is a Fresnel lens on a transparent substrate, the article may have traditional see through transparent regions and an Optical Element containing region where the Optical Element appears as a semi-spherical bulge raising out of or down into the transparent package (depending on whether the Fresnel lens is a positive lens or a negative lens) and if the embossed surface of the Optical Element is metalized with a highly reflective ink, metallic ink, or foil transfer, the raised or depressed bulge will appear to be a convex or concave mirror surface (resembling a Christmas ornament), as described by Kimberly-Clark Worldwide's U.S. Pat. No. 7,433,105, but with the economy and efficiency of only embossing the Optical Element into a select area of Optical Element receptive coating, as opposed to cutting and placing individual Optical Elements onto an embossing form and embossing into an overall coverage of clear Optical Element receptive coating.

Additionally, if the Fresnel lens is a magnifying lens, the selective Fresnel lens may magnify the contents of the transparent package to accentuate the contents or allow for reading portions of the product labeling. This technology can also be used to impart numerous other selective optical effects such as diffraction patterns, triangular, square or other shaped Fresnel lenses, similar to the star shaped Fresnel lenses of Kimberly-Clark Worldwide's U.S. Pat. No. 6,800,357, but not requiring the expensive select Optical Elements cut and pasted onto an overall embossing plate, instead requiring only select embossing of an economical embossing plate containing Optical Elements which are only embossed in the desired select area containing an Optical Element receptive clear or highly reflective coating.

Illustrative embodiments of the disclosure are described below. The following explanation provides specific details for a thorough understanding of and enabling description for these embodiments. One skilled in the art will understand that the disclosure may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Common semi-rigid plastics include PET (Polyethylene terephthalate), PP (Polypropylene), PVC (Polyvinylchloride), APET (Amorphous Polyethylene Terephthalate, RPET (Recycle Polyethylene terephthalate), and PETG (Polyethylene terephthalate 1,4-cyclohexane dimethylene terephthalate). The thickness of the semi-rigid plastic film or sheet ranges from 125 to 750 microns.

DETAILED DESCRIPTION OF THE DRAWINGS

Figure 1:
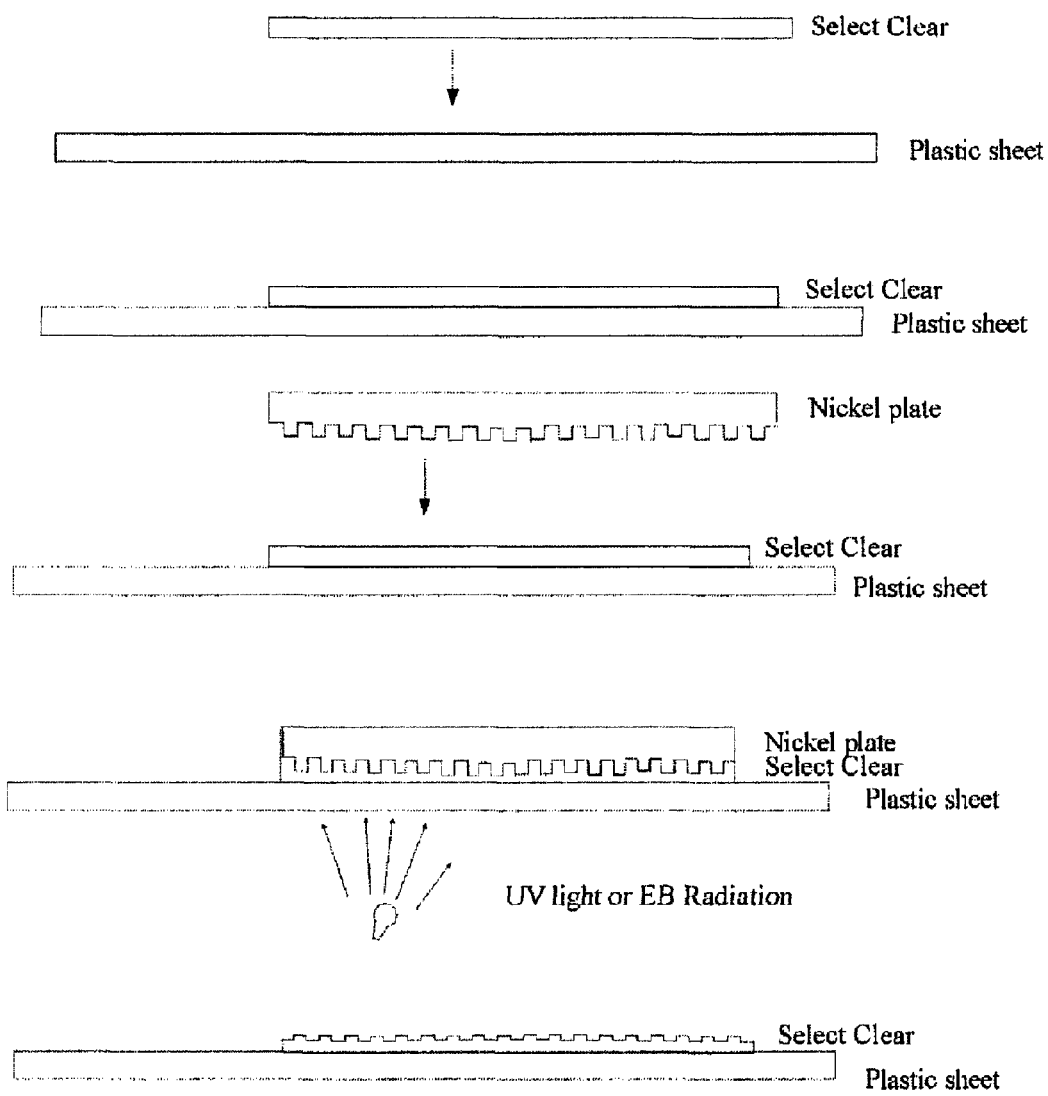
FIG. 1 is a schematic view of a method of manufacturing a semi-rigid plastic decorated article in accordance with one embodiment.

Referring to FIG. 1, which shows the process of manufacturing a decorated article, carton, package, box or the like by one embodiment of this invention, comprising a substantially planar plastic sheet with a top surface and a bottom surface wherein a select clear coating receptive to the impression of an Optical Element and capable of being hardened by ultraviolet light or electron beam radiation is selective applied in a desired area using traditional methods such as screen, gravure, litho, and flexo printing, where the coating is embossed with an Optical Element and hardened while in contact with the Optical Element, after which the Optical Element is removed and the coating adopts the mirror image of the Optical Element.

Note, in other embodiments; the select clear coating may be replaced with a highly reflective coating such as a metallic or high gloss ink, a tinted or colored ink or coating, or the select coating may be subsequently printed or foil stamped with a metallic or highly reflective material to enhance the brilliance of the Optical Element.

FIG. 1 is a schematic view of a method of manufacturing a semi-rigid plastic packing box in accordance with one embodiment of the invention. The sequences begin at the top of the figure and end at the bottom. First, the select region for a desired Optical Element is defined according to the design. A clear, colored, or highly reflective coating receptive to impression with an Optical Element, hardening while in contact, easily removed from contact with the Optical Element, and retaining the mirror image of the Optical Element, is applied to this defined select region. An embossing form consisting of at least one mirror image of a desired Optical Element is positioned in proper alignment with the select coating and the embossing form and the select coating are brought into intimate contact and the coating is hardened, by UV light or EB radiation in a preferred embodiment, such that the coating permanently adopts the mirror image of the Optical Element(s) contained on the embossing form. The resulting semi-rigid transparent plastic film or sheet now has an Optical Element positioned into a desired select region, and can be further decorated, printed, die cut, and folded into a carton, package, box or the like.

Figure 2:
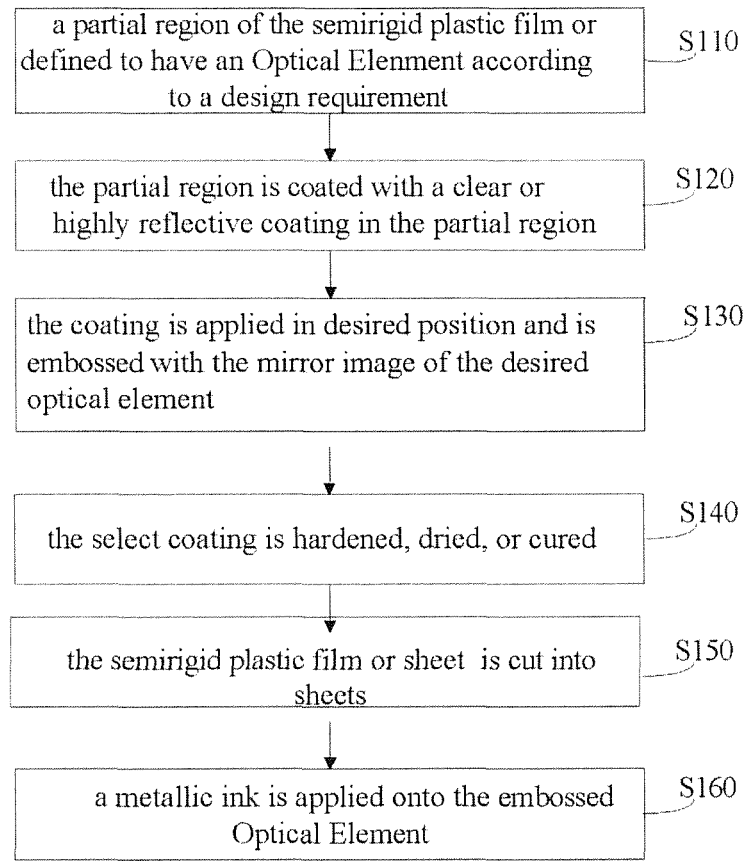
FIG. 2 is a flowchart of a method of manufacturing the semi-rigid plastic decorated article in accordance with one embodiment.

Referring to FIG. 2, in this illustrated embodiment, the semi-rigid plastic film is made of a see through transparent material as it is often desirable to observe the product in the packing box. In step S110 a select region for incorporation of the desired Optical Element is defined according to a design requirement of the final product, Step S120, this defined select region is coated with a clear, colored, or highly reflective coating that is receptive to adoption of an Optical Element when an Optical Element is brought into intimate contact and pressure applied to impress the Optical Element mirror image into the coating. The receptive coating may be a very pliable coating such as a liquid requiring minimal pressure to adopt the form of the Optical Element which is further hardened by heat, pressure, or energy, as is commonly known in the industry, or a malleable coating which substantially adopts the form of the Optical Element by moderate pressure embossing and does not require additional heat of energy, as is commonly known in the holographic embossing industry.

Step 130, the Optical Element receptive coating is placed into intimate contact with an embossing form containing the Optical Element(s), Step 140, in one embodiment, while in intimate contact, the coating and embossing form are subjected to UV light or EB radiation to harden the coating and make the mirror image of the Optical Element permanently formed in the coating, where after separating the coating from the embossing form. In another embodiment, Step 140 involves a coating not in a liquid state but that is somewhat soft and malleable, or formable with moderate pressure, and the embossing form containing the Optical Element is brought into contact in the desired position o the coating and moderate pressure is applied to emboss the mirror image of the Optical Element into this select area of coating.

Step 150 describes another embodiment where the semi-rigid plastic film containing the mirror image of the Optical Element is further cut into individual sheets, and Step 160, a metallic or highly reflective ink is applied (printed, coated, foil transferred, hot stamped, as commonly known in the industry) to the embossed surface of the coating to accentuate, enhance the visual impact of the Optical Element.

Figure 3:
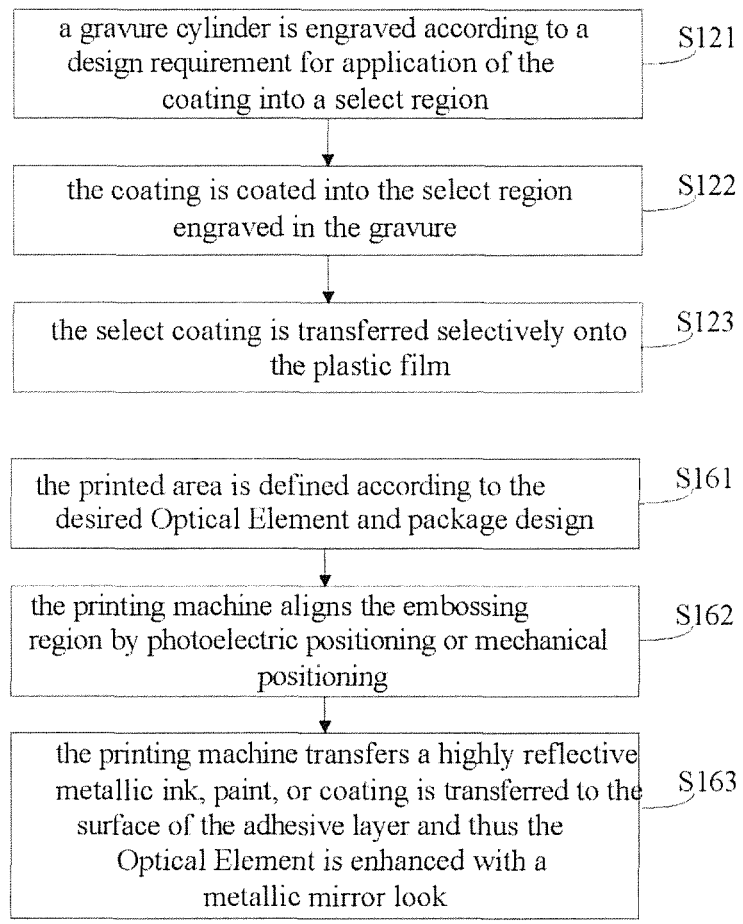
FIG. 3 is a specific flowchart detailing step S120 and S160 of the method of manufacturing the semi-rigid plastic decorated article of FIG. 2.

Referring to FIG. 3, in this particular embodiment the particular steps S120 and S160 are explained in more detail. In this embodiment, S120, the select region is coated by a gravure press: Step S121, a gravure cylinder is engraved in a select region according to a design requirement for application of the select clear or highly reflective coating.

Step S122, a layer of clear, colored, or highly reflective coating is coated onto the selectively engraved gravure cylinder and non-engraved areas on the cylinder are wiped, metered, scraped of any coating, Step S123, the select coating is transferred onto the plastic film or sheet into the precise position utilizing an electric eye and servo-motors as defined according to the design. The thickness of the UV adhesive layer ranges in a preferred embodiment range from 10 μm to 50 μm (but is not limited to this range as larger Optical Elements may require). The select coating layer may be an adhesive for selectively receiving transfer foils, transparent or a translucent material, an opalescent, fluorescent, UV fluorescing, or colored coatings or inks, capable of adopting the mirror image of the Optical Element under minimal to moderate pressure and/or being further hardened while in contact with the embossing form by UV light, EB radiation, heat, time, or pressure.

In a preferred embodiment, an additional layer of coating is selectively applied prior to the select coating to provide a stronger bond between the plastic film and the select clear and subsequent metallic ink.

Further, referring to FIG. 3, in another embodiment of the invention, the specific details of Step S160 of FIG. 2 are examined, where the select coating permanently embossed with the mirror image of the Optical Element is printed with a metallic ink: Step 161, a select region is defined for a metallic ink according to the desired design, Step 162, in this case a screen press aligns the select clear with the screen containing the desired metallic ink image area, and Step 163, the metallic ink is printed through the screen directly onto the embossed surface of the select coating, and may be printed onto additional non-Optical Element areas as desired for the particular design. This gives the Optical Element, and other areas if desired, a metallic appearance and enhances the visual impact of the Optical Element, and other areas.

One embodiment would involve a machine for pressing the Optical Element which would firstly properly position the select clear, colored, or highly reflective coating according to a desired design, a servo motor and a photoelectric eye would position the selectively coated film or sheet relative to a nickel plated embossing form which contains the mirror image of the desired Optical Element, and press the Optical Element into the select coating. The machine exerts pressure on the embossing form by a downward movement. Specifically, in this embodiment, the pressure ranges from 5N to 15N, but depending on the material properties of the coating, could require additional pressure to emboss the Optical Element into the coating. Typically, the embossing form is provided with a plurality of Optical Elements of a range of heights from 1 to about 20 μm. So the mirror image of the Optical Element in the resulting coating has a range of heights from about 1 to 20 μm, but it is to be understood that heights of the Optical Elements can be less than 1 μm when embossing such detailed Optical effects such as holograms and diffraction patterns, and larger than 20 μm when embossing textures and optical lens arrays with longer focal lengths, such as to focus on product details for a product contained within a carton of box where the carton or box contains the select Optical Elements.

In another embodiment, the Optical Elements can be created from a laser generated pattern. The steps of forming a visual three dimensional Optical Element selectively formed onto a select coating on a semi-rigid plastic film or sheet comprises: a laser engraved Optical Element engraved onto a glass origination, nickel origination, aluminum origination, and used from any of these origination forms, or these originations may be replicated using electroplating or other molding replication processes to produce more economic disposable embossing forms, which would then be used instead of the origination form to impress the Optical Element into the select coating.

In the illustrated embodiment, a UV light or EB radiation is used to irradiate a UV or EB cured clear or highly reflective coating, which makes the coating harden and cure in con tact with the embossing form such that the Optical Element is permanently formed into the coating. Specifically, in one preferred embodiment, three 4500 W UV lamps are used to irradiate the UV curable coating. The gravure rotates at 50 meters per minute, which ensures fully curing of the UV coating.

It is to be understood that, the metallic ink of Step 163 in FIG. 3 can be hot stamped or foil transferred by methods common to those knowledgeable about printing and decorating techniques.

It is of particular note that the above methods of manufacturing the semi-rigid plastic film or sheet with select Optical Elements do not need complete coverage of coating as do current "cast and cure" methods, nor do they need selectively generated embossing forms to create select areas of Optical Elements as is described in patents and in the public domain. In this invention, only a select area is printed or coated with a clear, colored, or highly reflective coating, and economical non-select embossing forms can create plastic films or sheets with select Optical Elements. Unwanted Optical Elements and/or excessive areas of coating are avoided, as is removal of unwanted coating to achieve a select three dimensional Optical Element effect which were required before this invention. The above method of manufacturing the semi-rigid plastic film or sheet is comprised of simple steps, simple operation and low cost, which is conductive to market appeal and success.

The plastic films or sheets manufactured by the above method also have a very unique and difficult if not impossible to replicate visual three dimensional Optical Element effects, which can be used for anti-counterfeit applications.

Although the present disclosure has been described with reference to the embodiments thereof and the best modes for carrying out the present disclosure, it is apparent to those skilled in the art that a variety of modifications and changes may be made without departing from the scope of the present disclosure, which is intended to be defined by the appended claims.

What is claimed is:

1. A method of manufacturing a semi-rigid plastic decorated article containing a select region bearing an optical element, consisting essentially of:
   establishing a substantially planar, substantially transparent semi-rigid plastic film or sheet having a top surface and a bottom surface,
   defining a select region of said semi-rigid plastic film or sheet,
   applying a highly reflective coating onto the top surface of said semi-rigid plastic film or sheet precisely onto said select region by a printing method selected from the group consisting of flexography, screen printing, gravure printing, lithography, and ink jet printing,
   positioning said select region of said coating into a pre-defined alignment with respect to an embossing form, said embossing form being an electroplated replication of an original optical element,
   bringing said coating and said electroplated replication embossing form into intimate contact one with the other,
   applying pressure such that said coating substantially adopts the mirror image of the optical element,
   curing the coating by ultraviolet light or electron beam radiation while said electroplated replication embossing form is in contact with said coating, said ultraviolet light or electron beam radiation being applied below said bottom surface of said plastic film or sheet, and
   separating the electroplated replication embossing form from the embossed coating such that the semi-rigid plastic film or sheet contains a select region exhibiting an optical element in the select region.

2. The method according to claim 1, wherein the surface of the embossed coating containing an optical element is decorated by said electroplated replication embossed form with a decoration selected from the group of a metallic ink, highly reflective ink, or a foil transfer of metal film.

3. The method according to claim 1, wherein the plastic film or sheet is decorated with graphics and text on the top or bottom or both surfaces.

4. The method according to claim 1, wherein the semi-rigid plastic film or sheet is optically clear and at least a portion thereof is not decorated or printed and not containing an optical element, wherein said at least portion thereof is produced according to said method applied to a portion of the semi-rigid sheet containing an optical element.

5. The method according to claim 1, wherein a thickness of the plastic film or sheet ranges from 125 μm to 750 μm.

6. The method according to claim 1, wherein the step of positioning the coating is accomplished using registration marks on the plastic film or sheet which are identified by an optical electric eye and the optical electric eye sends a signal to a motor which moves the plastic sheet into the predefined desired position, and the coating is printed in the desired location relative to the registration marks.

7. The method according to claim 1, wherein the process of positioning the embossing form containing an optical element relative to the clear or highly reflective coating involves an optical electronic eye determining the precise position of said coating, sending a signal to a motor which moves the position of the embossing form such that the optical element is put into intimate contact with said coating in the predefined select region.

* * * * *